United States Patent [19]

Prince, Jr. et al.

[11] 4,123,196

[45] Oct. 31, 1978

[54] SUPERSONIC COMPRESSOR WITH OFF-DESIGN PERFORMANCE IMPROVEMENT

[75] Inventors: David C. Prince, Jr.; Carl C. Koch, both of Cincinnati, Ohio

[73] Assignee: General Electric Company, Cincinnati, Ohio

[21] Appl. No.: 737,229

[22] Filed: Nov. 1, 1976

[51] Int. Cl.² .................. F01D 19/00; F02C 00/00
[52] U.S. Cl. .................. 415/181; 137/15.2; 60/39.29; 60/204
[58] Field of Search .......... 415/181; 137/15.1, 15.2; 60/39.27, 39.29, 204

[56] References Cited

U.S. PATENT DOCUMENTS

| | | | |
|---|---|---|---|
| 2,935,246 | 5/1960 | Roy | 415/181 |
| 3,552,873 | 1/1971 | Ghougasian | 415/181 UX |
| 3,652,182 | 3/1972 | Deich | 415/168 |
| 3,820,918 | 6/1974 | Goldstein | 415/181 |
| 3,849,020 | 11/1974 | Eastman | 60/39.27 |
| 3,951,566 | 4/1976 | Mattei | 415/115 |
| 3,993,414 | 11/1976 | Meauze | 415/181 |
| 4,000,869 | 1/1977 | Wong | 137/15.1 |
| 4,012,165 | 3/1977 | Kraig | 415/181 |

Primary Examiner—Robert E. Garrett
Attorney, Agent, or Firm—Robert C. Lampe, Jr.; Derek P. Lawrence

[57] ABSTRACT

A turbomachine such as a compressor having one or more rows of blades designed to operate at a supersonic inlet relative Mach number is provided with a manifold surrounding the blade tips for extracting air from the passages between adjacent blades by an amount generally inversely related to the inlet relative Mach number, thereby restructuring the shock pattern. Extraction rate is modulated by a valve operatively connected to the turbomachine fuel control system.

10 Claims, 22 Drawing Figures

100% OF DESIGN SPEED

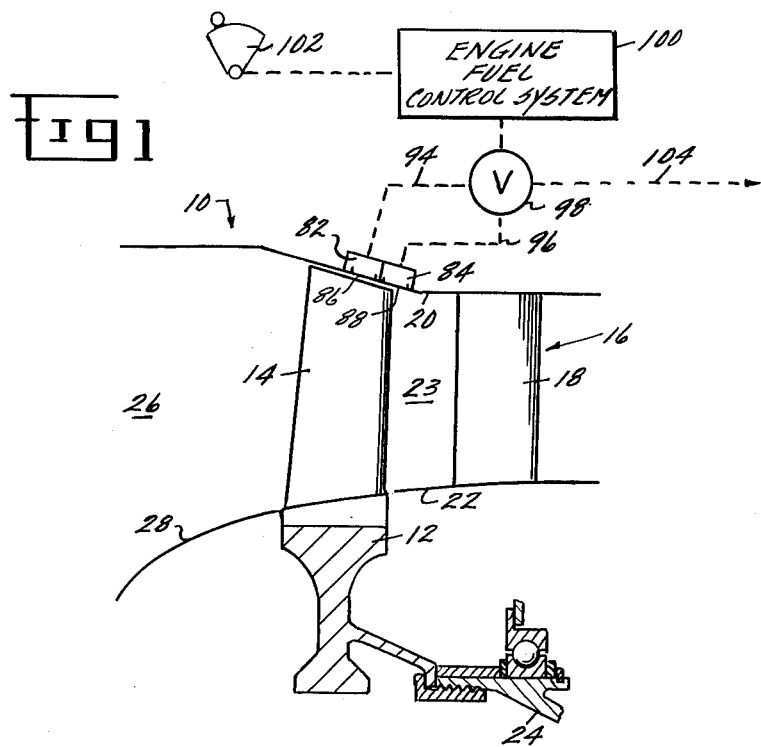

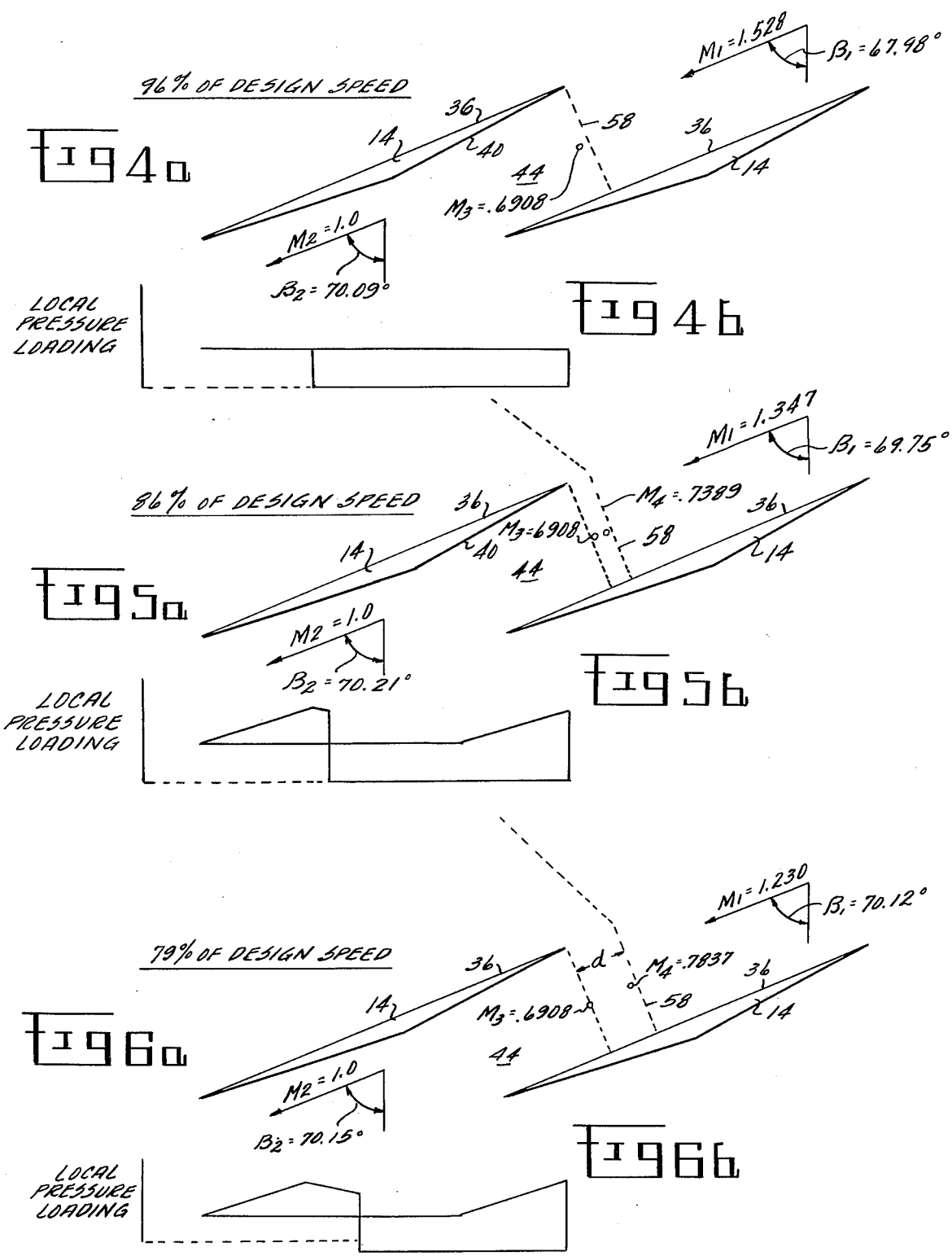

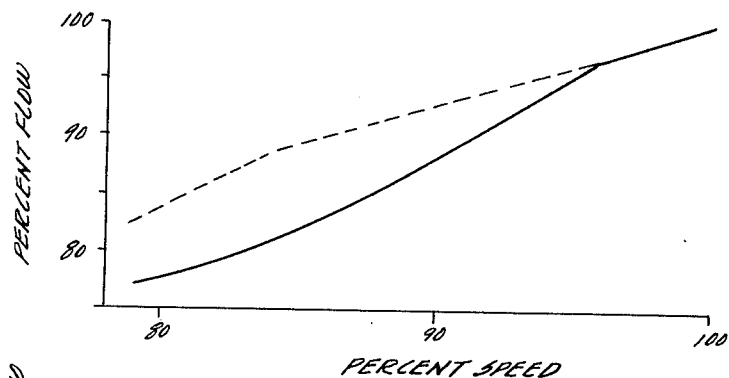
Fig 7a.
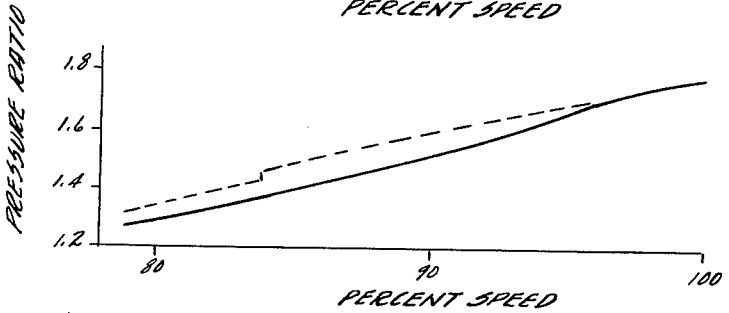
Fig 7b.
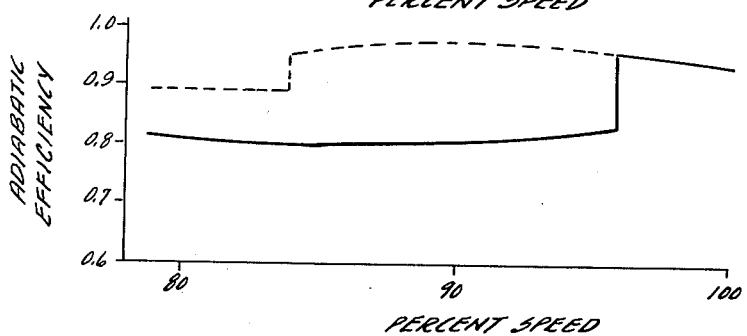
Fig 7c.
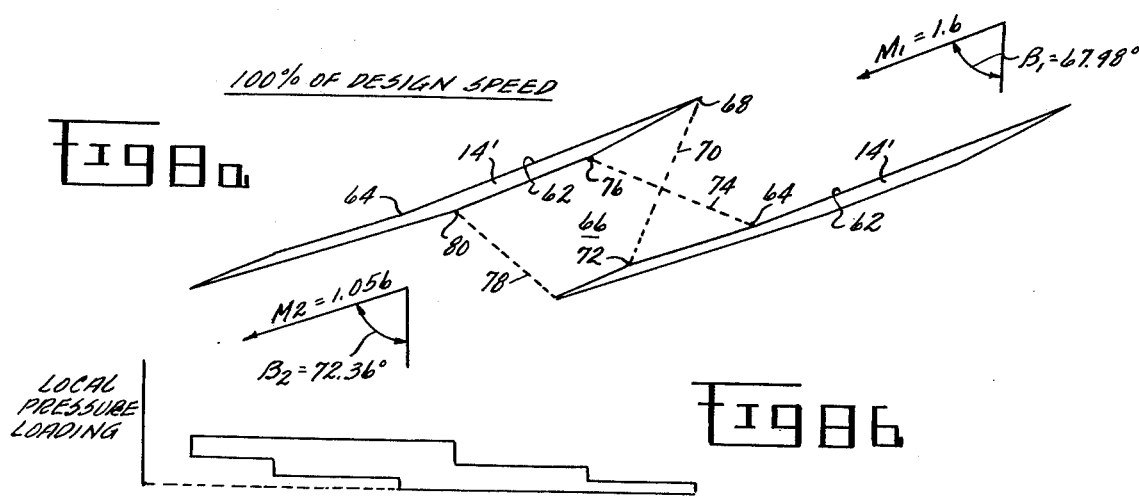
Fig 8a.
Fig 8b.

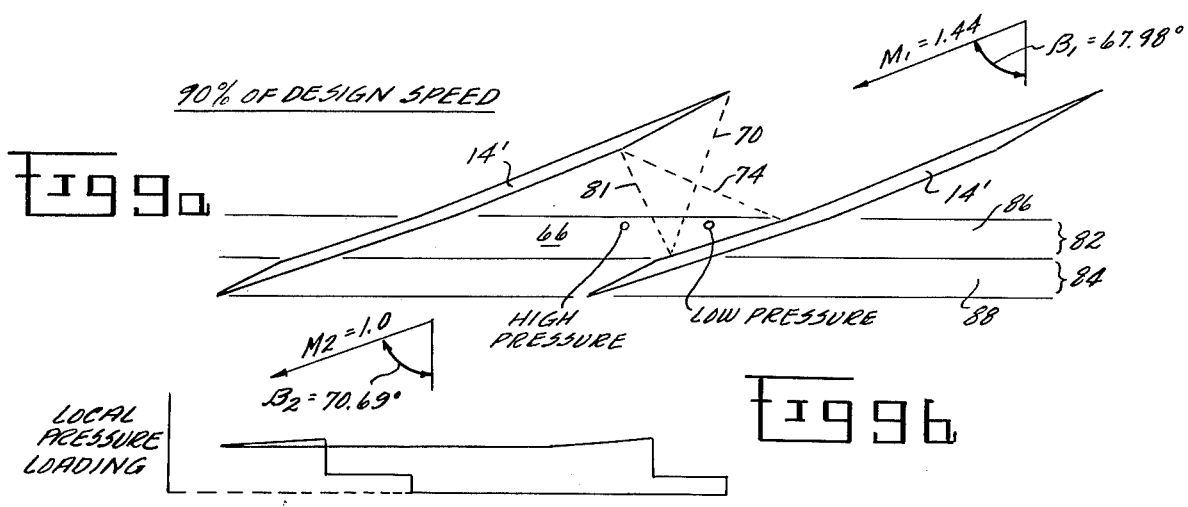
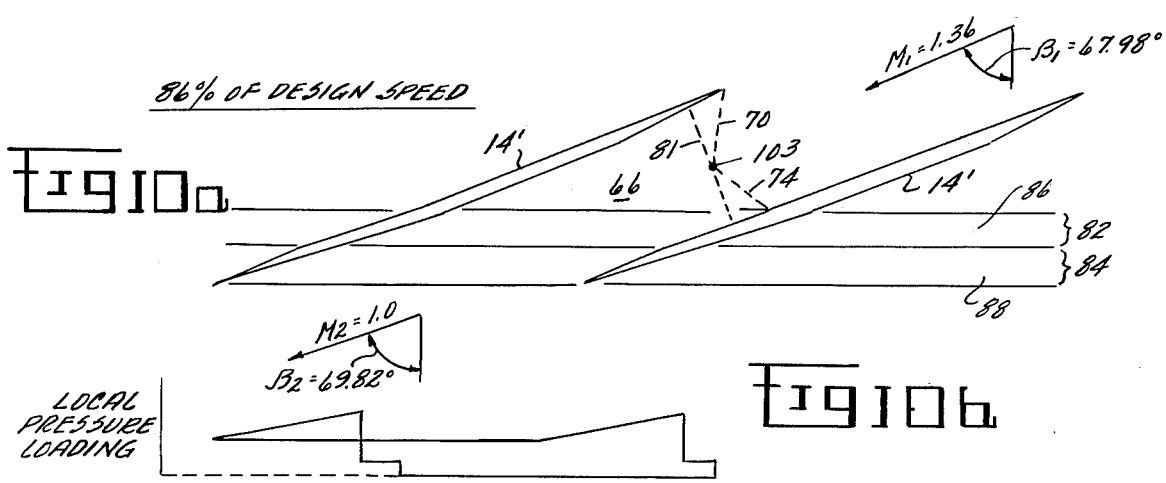
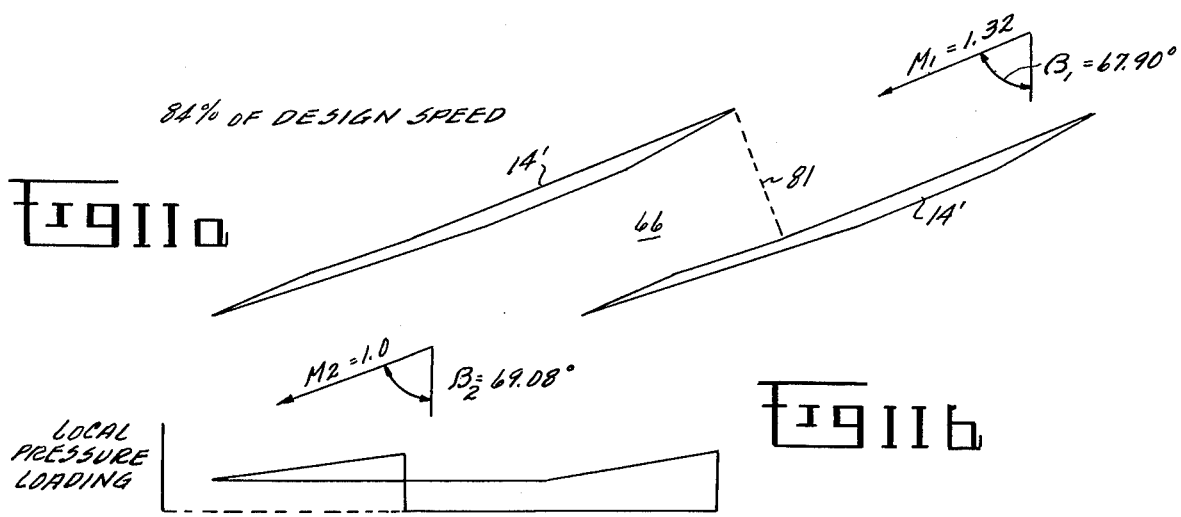

SUPERSONIC COMPRESSOR WITH OFF-DESIGN PERFORMANCE IMPROVEMENT

The invention herein described was made in the course of or under a contract, or a subcontract thereunder, with the U.S. Department of the Air Force.

BACKGROUND OF THE INVENTION

This invention relates to axial flow gas turbine engine compressors and fans and, more particularly, to compressor stages in which the relative flow velocity entering the rotating blade row is supersonic.

The purpose of the compressor or fan in a gas turbine engine is to raise the pressure and reduce the volume of air as it is pumped through the engine. The compressor comprises a plurality of axially stacked stages, each stage consisting of a row of rotating blades (rotor blades) followed by a row of stationary blades (stators). Within each stage the airflow is accelerated through the rotor and decelerated through the stator with a resulting pressure rise, the pressure ratio being multiplied by each succeeding stage. The cross-sectional area of the compressor decreases gradually through the compressor from the low to the high pressure end in order to maintain the axial velocity of the air as pressure increases. Each rotor blade and stator are of airfoil section, and the number and size of each change from stage to stage as the air passages through the compressor are gradually diminished.

The work input of the rotor (i.e., the work done on the air) is generally a function of the difference of the square of the absolute velocities exiting and entering the rotor, plus the difference of the square of the relative velocities entering and exiting the rotor. Thus, the energy input per stage can increase by decreasing the inlet absolute velocity and the discharge relative velocity, or by increasing the inlet relative velocity and discharge absolute velocity. Clearly, both alternatives are limited. Inlet absolute velocity is determined by the flow capacity of the compressor and cannot be easily adjusted in a practical manner to control work input. The possiblity of decreasing the discharge relative velocity is limited by the permissible adverse pressure gradient in the rotor passages between blades. Therefore, the attainment of higher compression ratios per stage is more readily attained by increasing the values of inlet relative velocities and discharge absolute velocity. Since these velocities are, in essence, the relative velocities into both the rotor and the following stator passages, large shock losses may be produced if these velocities are permitted to become supersonic. On the other hand, the requirement that the rotor inlet relative velocity be subsonic imposes limitations on the peripheral speed of the rotor. Thus, the requirements of high compressor capacity and high stage compression ratio cannot be satisfied in a conventional subsonic machine. It is clear, then, that supersonic compressors (i.e., axial flow compressors having supersonic relative velocities at the rotor blade leading edge) offer considerable savings in weight and size for any predetermined flow capacity and pressure ratio, but only provided that they are also so designed as to reduce the severity of the shock losses.

SUMMARY OF THE INVENTION

Accordingly, it is the primary object of the present invention to provide a mechanism for reducing the severity of shock losses in the rotors of supersonic compressors.

It is another object of the present invention to provide a method for operating a gas turbine engine compressor such that the shock losses are minimized.

These and other objects and advantages will be more clearly understood from the following detailed description, drawings and specific examples, all of which are intended to be typical of rather than in any way limiting on the scope of the present invention.

Briefly stated, and in accordance with the present invention and the objectives stated hereinabove, there is provided a method of improving the operation of a supersonic turbomachine such as a compressor by minimizing shock losses therein, this method being characterized in that surrounding the periphery of the rotor there is provided at least one manifold in fluid communication with the passages between adjacent rotor blades. A portion of the air is extracted from the rotor passages and transferred elsewhere in the engine, the amount of air being extracted being controlled as a function of the rotor upstream relative Mach number. In this manner, a series of oblique shocks may be maintained in the passages even at off-design operating conditions rather than experiencing a normal shock standing upstream of the blade row. A gain in efficiency (i.e., reduced losses) results from accepting a normal shock loss only after a substantial amount of efficient compression through the oblique shock structure.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 is a schematic view in cross section of a portion of a gas turbine engine fan incorporating the present invention;

FIGS. 2–6 show, in developed cylindrical section at the blade tips, the variation in shock structure with the blade rotational speed (i.e., relative inlet Mach number) of typical rotor blades of triangular profile similar to those of the fan of FIG. 1 and the associated pressure loading distribution;

FIG. 7 depicts graphically the aerodynamic performance parameters of the subject invention; and FIGS. 8–11 show, in the manner of FIGS. 2–6, the variation in shock structure with rotational speed of a modified set of rotor blades incorporating the subject matter of the present invention and the associated pressure loading distribution.

DESCRIPTION OF THE PREFERRED EMBODIMENT

Referring to the drawings wherein like numerals correspond to like elements throughout, attention is first directed to FIG. 1 wherein a gas turbine engine fan, depicted generally at 10, and embodying the present invention is diagrammatically shown. This fan, representative of a typical turbomachine, may be considered as comprising a rotatable rotor 12 carrying blades 14 about the periphery thereof, followed by a stator 16 having vanes 18. The rotor and stator comprises a turbomachinery stage, the stage being disposed within coannular casings 20 and 22 which cooperate to form an annular flow passage 23. The rotor is mounted to a drive shaft 24 which, in turn, is rotatably driven by a turbine, not shown, in the usual manner of a gas turbine engine. The fixed nonrotatable stator vanes (which may be of the variable area type) are fastened to the casing walls by known means. In operation, air enters inlet 26 defined, in part, by spinner or stationary centerbody 28, is accelerated through the rotor blades 14 and thereafter diffused and decelerated through the stator vanes 18 with a resultant pressure rise. In accordance with the present invention, the mass flow rate of air and the rotor rotational speed are such that the leading edges of the blades 14 experience a supersonic flow of air impinging thereupon. The above description is typical of many present-day gas turbine engine compression devices and is not meant to be limiting to fans, as it will become readily apparent from the following description that the present invention is equally applicable to any supersonic turbomachinery compression stage, whether it be a fan or multistage compressor. The foregoing description of the operation of the fan depicted in FIG. 1 is, therefore, merely meant to be illustrative of one type of application.

Design techniques for achieving high compression efficiency in fan and compressor stages intended to operate with supersonic inlet Mach numbers may be classified according to the relative upstream and downstream Mach numbers. The primary application for the present invention is expected to be in compression stages having a relative upstream Mach number greater than 1.55 and a relative downstream Mach number between 0.95 and 1.1. The theory of gas dynamics shows that this design condition requires constriction of the flow area through the passages between circumferentially adjacent pairs of rotor blades 14 by as much as 15 percent as the airflow passes from upstream to downstream of the blades.

A typical application for the present invention may be illustrated by first referring to FIG. 2a wherein there is depicted a developed cylindrical section taken through the tip region of a supersonic rotor showing a cascade 30 of two adjacent rotor blades 14 of generally triangular profile. This triangular cascade is utilized as a simplified example to explain the phenomenon of supersonic compressor flow and it is recognized that actual compressor rotor blade shapes are considerably more sophisticated as will soon be shown. However, the principles as explained herein are largely the same. This cascade is intended for operation at approximately 1600 ft/sec (488 m/sec) corrected blade speed. For this design operating condition, the cascade induces airflow to give a relative upstream velocity vector 34 parallel to flat suction surface 36 at a Mach number ($M_1$) of 1.6. An oblique shock 38 is generated on the pressure surface side 40 of the wedge-shaped leading edge 42, causing a pressure load on the airfoil, and raising the static pressure and enthalpy of the air. The shock wave 38 propagates across the passage 44 between circumferentially adjacent pairs of blades, intersecting the flat suction surface at its trailing edge 46. At this trailing edge, an oblique reflected shock 48 is generated with approximately twice the strength of the incident shock 38. This reflected shock propagates back across the cascade passage 44, intersecting the pressure surface near its center. A corner 50 on the pressure surface matches the deflection of the shock, cancelling it and leaving a uniform downstream flow exiting the cascade. Known methods are available for determining the leading edge wedge angle, the cascade solidity (i.e., ratio of blade chord to circumferential spacing), and the reflected shock strength required for a predetermined work input and resulting pressure ratio. For example, the particular cascade chosen for illustrative purposes in FIG. 2 has a 4.89° leading edge wedge angle, solidity of 1.316 and a reflected shock deflection of 9.17°, resulting in a relative exit Mach number ($M_2$) of 1.057 and a nominal stage pressure ratio of 1.84 after including a representative stator pressure loss. The characters $\beta_1$ and $\beta_2$ represent the inlet and exit relative air angles, respectively, measured from the axial direction (FIG. 2a).

Part speed operational characteristics of the cascade of FIG. 2a shown in FIGS. 3a–6a. At blade rotational speeds and relative Mach numbers slightly below the design operating condition (FIG. 3a), the wave angle of the leading edge shock 38 increases slowly and the shock intersects the suction surface 36 of the opposite blade slightly upstream of the trailing edge at a point 52 where it is then reflected as shock 54. A separate trailing edge shock 56 appropriate to the applied back pressure on the cascade is generated at the trailing edge 46 which quickly coalesces with the reflected shock. The combined strength of the reflected and trailing edge shocks (54, 56, respectively) may be sufficient to decelerate the flow to subsonic velocity, especially near the pressure surface 40 if the wave is incident upstream of the cancellation corner 50. Some local subsonic flow is permissible without destroying the basic oblique shock structure.

At even lower blade rotational speeds, or at higher values of back pressure, all of the flow downstream of the trailing edge shock 48 becomes subsonic. At this condition, the oblique shock structure is unstable and the cascade becomes "unstarted." "Unstart" is characterized by the appearance of strong normal shocks resulting in reduced airflow and lower pressure ratios. As is best shown in FIG. 4a wherein the rotor is rotating at 96 percent of design rotational speed, the flow reverts discontinuously to a completely subsonic passage condition having a normal shock 58 standing across the inlet to the passage 44. Such a normal shock pattern has associated therewith losses which are significantly greater than in oblique shock patterns. Since the cascade passage is convergent, the Mach number ($M_3$) at the passage inlet just behind the shock can be no higher than that corresponding to one-dimensional acceleration to sonic velocity ($M_2 = 1.0$ at the exit) through that particular area ratio associated with the passage convergence. In the example of FIG. 4a, that Mach number is approximately 0.69. If the Mach number ($M_4$) downstream of a normal shock standing upstream of the passage inlet (at a supersonic upstream relative Mach number) is higher than the maximum passage inlet Mach number, as in FIG. 5a at 86 percent of the design rotational speed, the normal shock 58 must stand far enough ahead of the passage inlet to allow room for flow deceleration. The shock on any particular blade 14 attenuates after passing in front of the leading edge of the adjacent blade 14 on a scale proportional to the standoff distance $d$ (see FIG. 6a at 79 percent of design rotational speed). For a significant standoff distance, there may be an appreciable shock loss extending over several blade passages.

Flow and pressure pumping, and stage efficiency (including a representative stator loss of 10 percent of its approach dynamic pressure) after allowing for the loss and spillage characteristics of the part-speed shock structure, may be estimated and are presented as the solid curves in FIGS. 7a, 7b and 7c, respectively. The approximation assumes low enough back pressure on the cascade throughout the speed range so that rotor passage throat flow will not be subsonic (i.e., it will remain sonic). It must be pointed out at this time that FIGS. 3–6 represent operating conditions on a slightly lower operating line than would be experienced by an actual turbomachine. However, the trends presented therein are representative and will suffice for sake of explanation. With more realistic back pressures at part speed, the induced flow would be lower and the loss due to the normal shock structure would be even higher than that shown.

Undesirable characteristics of the cascade design of FIGS. 2a–6a, in addition to the discontinuity in efficiency during "starting" at 96 percent of design corrected speed, include a sudden change in twisting moments due to aerodynamic loading. In the "unstarted" region below 96 percent speed, the blade is heavily leading-edge loaded with high pressures on surface 40 due to the subsonic flow behind the normal shock and low pressure on suction surface 36 after supersonic expansion around the blade leading edge. Trailing edge loading tends to be light where the subsonic relative exit flow extends its influence to the exposed pressure surface, and matches the subsonic passage flow. FIGS. 2b–6b depict the local pressure loading upon the left-hand blade of each cascade wherein loading is defined as the change in static pressure from ambient divided by the inlet dynamic pressure. As shown in FIGS. 4b, 5b and 6b, the loadings tend to impose a counterclockwise pitching moment upon the blade. In the "started" condition, above 96 percent design speed as represented by FIGS. 2a and 3a the blade is heavily trailing-edge loaded since the low pressure associated with supersonic flow extends over the entire suction surface 36, while the downstream half of the pressure surface 40 sees approximately three times the compression of the upstream half.

As noted hereinbefore, the triangular airfoil cascades of FIGS. 2–6 are merely utilized as examples, and actual compressor stages would exhibit much larger losses due to the shock structure than the triangular airfoil model. In reality, the transition from "unstarted" to "started" flow often leads to a flow discontinuity (not shown in FIG. 7a) as well as the discontinuities previously discussed which appear in blade force and efficiency.

In summary, the maximum internal passage area contraction that is possible in supersonic flow, giving due consideration to the conservation of mass, tends to increase with increasing inlet relative Mach number. Thus, one would expect that high-speed compressors and fans should be designed with a large internal passage contraction. However, this is not generally the case because at speeds below the design operating condition, the convergence would be too large to allow the flow to be passed supersonically. Instead, the flow would become "unstarted" with a large normal shock standing just within or ahead of the blade passage and producing high losses. To avoid such poor part-speed performance, most compressors and fans are designed as a compromise, having less than optimum design point convergence and thus reducing design point efficiency. The invention now to be described provides an alternative to this situation of design by compromise.

Some increase in cascade design sophistication appears to be desirable to avoid the inefficiency of "unstarted" flow at low operating speeds. The present invention achieves performance improvement through the beneficial influence of cover-the-rotor bleed which maintains an oblique shock pattern within the cascade passage by reducing the effective passage convergence so as to permit the flow to pass through the passage (or at least through most of the passage) supersonically. A possible, though by no means limiting, airfoil configuration for accomplishing this objective is shown in FIGS. 8–11. Therein, two modified blades 14' are depicted, each having a leading edge wedge identical with the simple triangular airfoil cascade of FIGS. 2–6. The suction surface 62, however, is no longer flat, but has a compression corner 64 across the passage 66 from the adjacent leading edge 68, with deflection similar to the wedge. The leading edge shock wave 70 is cancelled on the suction surface 72 and the compression corner shock 74 is cancelled on the pressure surface at 76, leaving a parallel wall passage having an area reduced from that at the passage inlet. A seperate trailing edge shock 78 is generated by the back pressure on the cascade and is cancelled on the pressure surface at 80. Shock deflections for such a modified triangle "double-compression" cascade obey the same relation as for the simple triangle airfoil cascade of FIGS. 2–6. However, the double-compression cascade offers significant improvement in reduced speed performance by permitting compression through one or two oblique shocks before a final normal shock compression.

The operating mode for the "double-compression" cascade of FIG. 8a requires sufficient intrapassage bleed to allow attachment of the passage inlet normal shock at lower than design point corrected rotational speed. Increasing the effective passage area, particularly at the exit, will modify the inlet Mach number to permit a "started" condition instead of the "unstarted" flow condition of FIG. 5a, for example. Thus, substantial efficiency improvement is attained for the portion of the flow going through the cascade by avoiding the losses due to standoff shock structure. Referring now to FIGS. 9a–11a in the speed range between 84 percent corrected speed and 90 percent corrected speed, it can be shown that the flow can remain supersonic after deceleration through one oblique shock wave at the leading edge wedge angle, but not through two such deflections. The bleed control of the subject invention is used to maintain a normal shock 81 at approximately the location where the two single compressions meet (FIG. 10a).

Referring again to FIG. 1, duct wall 20 is provided with a pair of manifolds 82, 84 which extend circumferentially around the tips of rotor blades 14. Apertures 86, 88 provide fluid communication between the annular flow passage 23 and manifolds 82, 84, respectively. As is best shown in FIGS. 9a and 10a, the axial disposition of the manifolds and apertures is such that aperture 86 provides communication between plenum 82 and approximately the third quarter of the axial projection of passage 66 between rotor blades 14' and aperture 88 provides communication between plenum 84 and approximately the last quarter of the passage axial projection. Returning to FIG. 1, manifolds 82 and 84 are connected by means of conduits 94 and 96, respectively, to a valve system 98 operated by a known variety of engine fuel control system 100. All of the parameters necessary to determine the position of valve system 98 (such as blade rotational speed) are normally available within the control as a function of pilot control lever 102 and need not be elaborated upon here. Preferably, air bled from the rotor portion is routed via conduit 104 to do work elsewhere in the cycle, such as to provide a source of cooling fluid for the turbine portion of the engine (not shown).

By modulating the flow extraction from manifolds 82 and 84, the position of the normal shock 81 may be maintained downstream of the oblique shocks and at approximately the location 103 where the two single oblique compression shocks meet. The advantage to such an arrangement is that a gain in efficiency results from accepting the normal shock loss only after a substamtial degree of efficient compression has occurred through the oblique shock structure. At the 90 percent corrected speed condition of FIG. 9a, the two single compression shocks 70, 74 can overlap into a double compression, the flow remaining supersonic. The normal shock is then confined entirely to the area downstream of the double-shock region, resulting in a further gain in efficiency. At even lower rotational speeds represented by FIG. 11a, the amount of bleed is such that the normal shock 81 stands no further forward than the passage 66 inlet so that the effect of the loss associated with the shock is limited to one passage, and not spread over several passages as was the case in FIGS. 5a and 6a.

It will be desirable to modulate the relative bleed rates through manifolds 82 and 84 as a function of blade operating condition. For example, in the condition represented by FIG. 9a, manifold 82 would sense both the relatively low pressure zone behind oblique shock 74 and the higher pressure zone behind normal shock 81. This would tend to establish recirculation through the manifold from the high to the low pressure zones and, thus, disrupt the shock structure. Accordingly, manifold 82 should be closed and only manifold 84 used to establish the desired shock pattern. At lower speeds as typified by FIG. 10a, the fluctuations in pressure are significantly reduced and both manifolds may be opened to provide increased bleed capacity to re-establish the shock structure.

Referring again to FIGS. 7a, 7b and 7c wherein the characteristics for the blade cascade of FIGS. 8a–11a are depicted by dotted lines, it is clear that the higher level of efficiency is maintained throughout a broader speed range and that the onset of "unstart" is delayed to a much lower speed (84 percent versus 96 percent). Also, pressure ratio and flow remain at higher levels. Attention is also directed to FIGS. 8b–11b wherein the pressure loading distributions distinctly show that there is no reversal or discontinuity in bending moment due to aerodynamic loading and that the pitching moment remains counterclockwise.

The inventive concept of bleeding air from between the rotor blades to effectively reduce the internal passage contraction applies to the generalized triangular airfoil cascade of FIGS. 2a–6a in the same manner as described with reference to the modified cascade of FIGS. 8a–11a. However, in the former case the potential efficiency gain would be only about one-third of that of the modified cascade having precompression of the air through an oblique shock structure upstream of the bleed air extraction orifice. Thus, while the present invention is applicable to a wide range of airfoil geometries, the degree of efficiency improvement will not always be the same. Notice also that the discontinuity in the efficiency curve of FIG. 7c still occurs though its onset is delayed and its magnitude lessened. For the particular cascade chosen by way of example, it is estimated that approximately 80–90 percent of the efficiency improvement available was achieved by delaying the onset of the "unstart" to 84 percent speed and that attempts to reduce it further were unnecessary.

It should be obvious to one skilled in the art that certain changes can be made to the above-described invention without departing from the broad inventive concepts thereof. For example, the embodiment of FIG. 1 depicts a pair of manifolds, one over each of the approximately aft two quarters of the flow passage. It is clear that any number of such manifolds may be placed across the blade depending upon the degree of area modulation desired to maintain the efficient oblique shock structure. However, in order to obtain the maximum benefit from the present invention, it should be utilized with an airfoil profile shape which produces some degree of compression to an oblique shock pattern prior to the bleed manifold location. The invention is equally applicable to stationary blade rows where the absolute leading edge velocity is supersonic. It is intended that the appended claims cover these and all other variations in the present invention's broader inventive concepts.

Having thus described the invention, what is claimed as novel and desired to be secured by Letters Patent of the United States is:

1. In a turbomachine having a row of blades disposed in an airflow and designed to operate at a supersonic inlet relative Mach number at the blade tips, and wherein each circumferentially adjacent pair of blades defines a generally convergent flow passage therebetween, the improvement comprising means for extracting air from the passages between blades of an amount generally inversely related to the inlet relative Mach number, the amount of extraction at the design operating condition being substantially zero and the amount of extraction at lower inlet relative Mach numbers being such as to reduce the effective convergence through the passage, thereby restructuring the shock pattern.

2. The invention as recited in claim 1 wherein said turbomachine includes a casing and said bladed row is oriented within said casing to blow and pressurize air axially therethrough from upstream to downstream, and wherein said extracting means comprises at least one manifold associated with the casing which circumscribes the blade tips and aperture means through said casing above said blade tips and not extending downstream thereof for providing fluid communication between said blade passages and said manifold.

3. The invention as recited in claim 2 wherein said aperture means is located above the blade tips and downstream of the passage inlet.

4. The invention as recited in claim 2 wherein said extracting means comprises a plurality of manifolds circumscribing the blade tips, each manifold including aperture means through said casing for providing fluid communicaton between said blade passages and its respective manifold.

5. The invention as recited in claim 2 wherein said turbomachine comprises a gas turbine engine.

6. The invention as recited in claim 5 wherein said blade row comprises a fan rotor.

7. The invention as recited in claim 6 wherein said extracting means includes valve means for modulating the rate of extraction through said manifold, and fuel control means operatively connected to said valve means to position said valve means in response to measured parameters, including rotor rotational speed.

8. The invention as recited in claim 2 wherein said blades include a contoured profile which induces precompression of the air through a pair of oblique shocks proximate the passage inlet and upstream of the aperture means at the design operating condition.

9. The invention as recited in claim 8 wherein the amount of air extraction at a part-speed operating condition is sufficient to obtain precompression of the air through at least one oblique shock prior to taking a normal shock loss within the passage.

10. In a method of operating a turbomachine having a row of blades disposed in an airflow and designed to operate at a supersonic inlet relative Mach number, and wherein each circumferentially adjacent pair of blades defines a generally convergent flow passage therebetween, the step of extracting air from the passages of an amount generally inversely related to the inlet relative Mach number, the amount of extracton at the design operating condition being substantially zero and the amount of extraction at lower inlet relative Mach numbers being such as to reduce the effective convergence through the passage, thereby restructuring the shock pattern.

* * * * *